Patented Aug. 26, 1924.

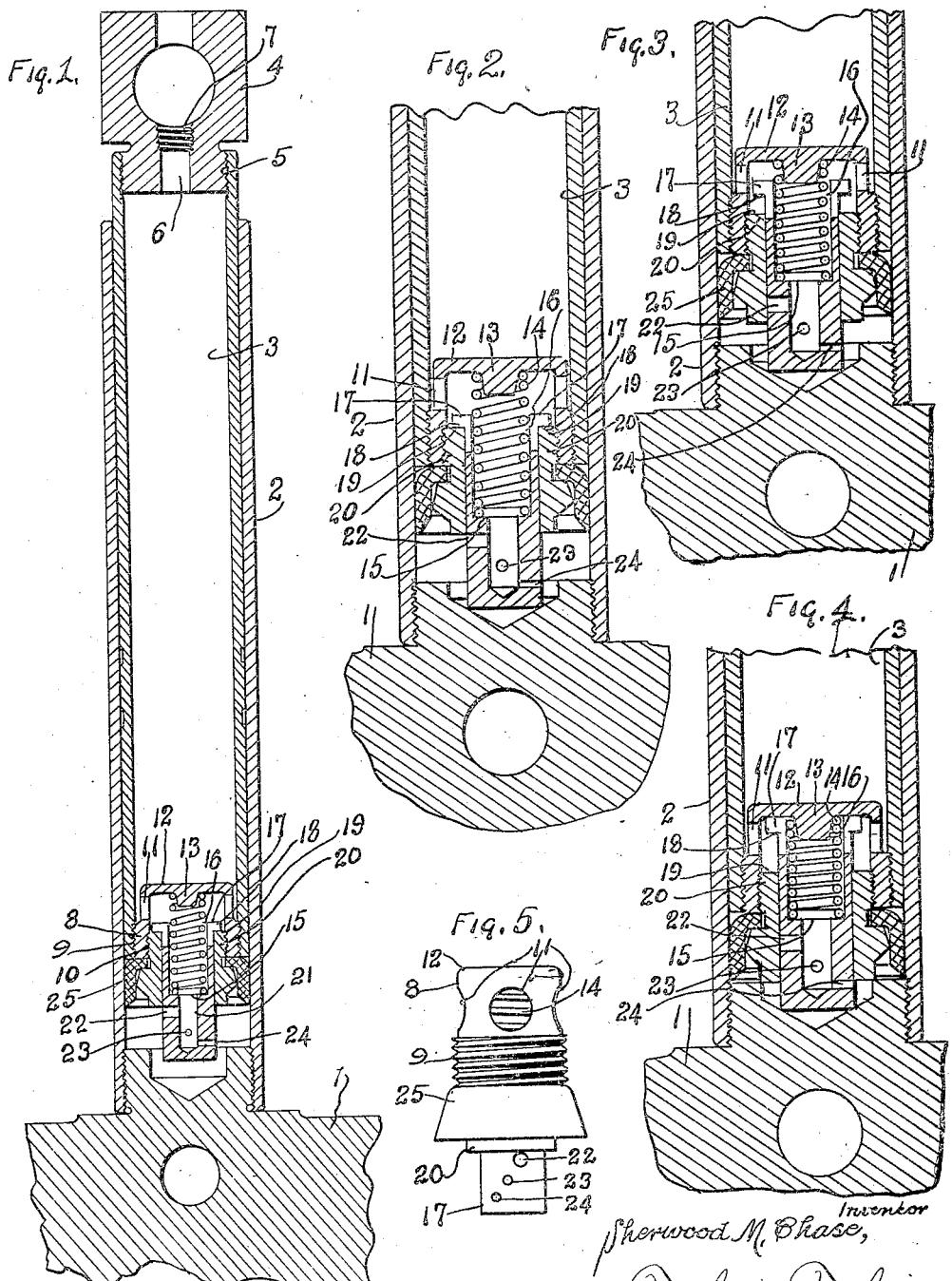

1,506,711

UNITED STATES PATENT OFFICE.

SHERWOOD M. CHASE, OF COLUMBUS, OHIO.

VALVE.

Application filed July 5, 1923. Serial No. 649,687.

*To all whom it may concern:*

Be it known that I, SHERWOOD M. CHASE, a citizen of the United States, residing at Columbus, in the county of Franklin and State of Ohio, have invented certain new and useful Improvements in Valves, of which the following is a specification, reference being had therein to the accompanying drawing.

My invention relates to valves, and in particular to check valves.

It is the object of my invention to provide a valve which will progressively check the passage of fluid therethrough depending upon the pressure on the valve.

My invention is particularly useful where it is employed in the checking of fluids in cylinders and the like as in lift trucks, but I do not desire to confine myself to such adaptations only.

Referring to the drawings:

Fig. 1 is a section through the cylinders and check valve;

Fig. 2 is an enlarged section showing the valve in position where it has a light load and the fluid is passing through all three of the orifices;

Fig. 3 is a section showing the parts in position where the large orifice is closed due to the pressure of a medium load;

Fig. 4 is a section showing the parts in position where only one small orifice is opened by the passage of the liquid by reason of the pressure of a very heavy load;

Fig. 5 is a side elevation of the complete check valve.

Referring to the drawings in detail, 1 is a supporting body to which is attached the outside cylinder 2. This cylinder and supporting body may be stationary or may be moved towards the inside cylinder 3 and its connecting head 4. The connecting head 4 is threaded into the cylinder 3 as at 5. A filling passageway 6 for introducing the cushioning fluid into the cylinder is provided in the head 4. This passageway is sealed by the plug 7.

The lower end of the cylinder 3 which telescopes within the cylinder 2 is threaded to a cup shaped member 8 which is externally threaded at 9 and internally threaded at 10. This cup shaped member is provided with a series of openings 11 in the side wall thereof, the side wall being spaced from the inside of the cylinder 3. A cap 12 is provided on the under side of which is a depending boss 13 for positioning a helical spring 14 which engages with the bottom of the cap 12. The other end of this spring fits on a shoulder 15 in a cylindrical passageway 16 of a plunger 17. This plunger is provided with a shoulder 18 which engages with the shoulder 19 of a plug 20. This plug is externally threaded into the internal threads of 8 as at 10. The passageway 16 in which the spring travels is extended into a restricted passageway 21. This passageway is provided with a large laterally extending passageway 22 at a point just beneath the plug 20. At a lower elevation a passageway of finer diameter is located at 23 while still lower another passageway of the same diameter is located at 24, thus providing successive passageways of different diameter for the progressive passage of the oil or cushioning medium.

The plug 20 embraces between it and the bottom of the cup 8 a washer 25 which seals this assembly of parts to the side walls of the outer cylinder 2.

In operation, if there is a light load or relatively light force causing the cylinders to telescope then the pressure on the bottom of the plug against the resistance of the spring will not be sufficient to compress the spring and the oil in the lower cylinder will escape into the upper cylinder through all three of the passageways designated 22, 23, and 24.

However, if the load is one of medium character, then the pressure will be sufficient to close the orifice 22 by compressing the spring and moving the plunger sufficiently for that purpose.

If a load is of great severity then both passageways 22 and 23 will be closed due to the corresponding pressure of the spring and the plunger on the valve body.

By this varying direction of the passage of oil from one cylinder to another during the compressing operation, speed of compression is adjusted to the amount of the load so that the passage of the cushioning fluid is automatically adjusted to the necessity for it.

It will be understood that I comprehend within my invention suitable modifications and do not desire to be limited to the specific form shown nor to the details of construction.

Having thus fully described my invention, what I claim as new and desire to secure by Letters Patent, is:—

1. In a valve, a supporting body, a movable body, yielding means to maintain said movable body normally in one position, said movable body having a plurality of openings of varying sizes adapted to permit the passage of fluid, the openings to a degree depending upon the amount of pressure being imposed upon the movable member.

2. In combination, a cylinder, a second cylinder adapted to telescope therein, a check valve carried by said second cylinder, a movable member in said check valve extending into the first cylinder and having means for permitting of the passage of fluid from one cylinder into the other progressively, yielding means to maintain said movable member in its seated position, said movable member being arranged to decrease the passage of fluid therethrough according to the degree of its movement against the resistance of the yielding means, and said movable member being actuated by the pressure in the first cylinder.

3. In combination, a cylinder, a second cylinder adapted to telescope therein, a check valve carried by a second cylinder, a plunger adapted to permit the cylinders to communicate with one another, a plurality of openings in said plunger communicating with the first cylinder with a common means of communication with the second cylinder, said means of communication with the first cylinder being exposed when the plunger is seated, yielding means to retain said plunger seated, whereby when the pressure increases in the first cylinder against the plunger the yielding means will be compressed and the means of communication with the first cylinder will be successively cut off.

4. In combination, a cylinder, a second cylinder adapted to telescope therein, a check valve carried by a second cylinder, a plunger adapted to permit the cylinders to communicate with one another, a plurality of openings in said plunger communicating with the first cylinder with a common means of communication with the second cylinder, said means of communication with the first cylinder being exposed when the plunger is seated, yielding means to retain said plunger seated, whereby when the pressure increases in the first cylinder against the plunger the yielding means will be compressed and the means of communication with the first cylinder will be successively cut off, said means of communication with the first cylinder be-being of progressive sizes.

In testimony whereof I affix my signature.

SHERWOOD M. CHASE.